US012621903B2

(12) United States Patent
Lee et al.

(10) Patent No.: US 12,621,903 B2
(45) Date of Patent: May 5, 2026

(54) METHOD AND APPARATUS FOR ENHANCING DRX CONFIGURATION IN WIRELESS COMMUNICATION SYSTEM

(71) Applicant: Samsung Electronics Co., Ltd., Suwon-si (KR)

(72) Inventors: Taeseop Lee, Suwon-si (KR); Anil Agiwal, Suwon-si (KR); Jaehyuk Jang, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/303,984

(22) Filed: Apr. 20, 2023

(65) Prior Publication Data

US 2023/0345576 A1     Oct. 26, 2023

(30) Foreign Application Priority Data

Apr. 22, 2022     (KR) ........................ 10-2022-0050060

(51) Int. Cl.
| | |
|---|---|
| *H04W 76/28* | (2018.01) |
| *H04L 27/26* | (2006.01) |
| *H04W 72/23* | (2023.01) |
| *H04W 72/232* | (2023.01) |

(52) U.S. Cl.
CPC ....... *H04W 76/28* (2018.02); *H04L 27/26025* (2021.01); *H04W 72/232* (2023.01)

(58) Field of Classification Search
CPC ................ H04W 76/28; H04W 72/232; H04L 27/26025
See application file for complete search history.

(56) References Cited

U.S. PATENT DOCUMENTS

| | | | |
|---|---|---|---|
| 10,567,143 | B2 | 2/2020 | Son |
| 11,172,370 | B2 | 11/2021 | Vajapeyam et al. |
| 2019/0052416 | A1 | 2/2019 | Babaei et al. |
| 2020/0059988 | A1 | 2/2020 | Tabet et al. |

(Continued)

FOREIGN PATENT DOCUMENTS

| | | |
|---|---|---|
| EP | 3 606 200 A1 | 2/2020 |
| KR | 10-20220049538 A | 4/2022 |
| WO | 2022/051675 A1 | 3/2022 |

OTHER PUBLICATIONS

Huawei et al., "Discussion about RAN2 impacts of Ext 52-71GHZ," 3GPP TSG-RAN WG2 Meeting #117-e R2-2202710, Feb. 21-Mar. 3, 2022.

(Continued)

*Primary Examiner* — Ronald B Abelson

(74) *Attorney, Agent, or Firm* — Jefferson IP Law, LLP

(57) ABSTRACT

The disclosure relates to a 5th generation (5G) or 6th generation (6G) communication system for supporting a higher data transmission rate. A method performed by a user equipment (UE) in a wireless communication system is provided. The method includes receiving configuration information regarding a discontinuous reception (DRX) from a base station, starting a first timer based on the configuration information, and monitoring a physical downlink control channel (PDCCH) based on the first timer, wherein the configuration information includes a first timer value for a first subcarrier spacing (SCS) group and a first timer value for a second SCS group.

12 Claims, 13 Drawing Sheets

(56) References Cited

U.S. PATENT DOCUMENTS

| 2020/0359316 | A1 | 11/2020 | Shi et al. |
| 2021/0410180 | A1 | 12/2021 | Tsai et al. |
| 2023/0163926 | A1 | 5/2023 | Yang et al. |
| 2023/0353987 | A1* | 11/2023 | Babaei .................. H04L 5/0053 |

OTHER PUBLICATIONS

Huawei et al., "Discussion about RAN2 impacts of Ext 52-71GHZ," 3GPP TSG-RAN WG2 Meeting #116-e R2-2109604, Nov. 1-12, 2021.

International Search Report and written opinion dated Jul. 24, 2023, issued in International Application No. PCT/KR2023/005390.

Extended European Search Report dated May 8, 2025; European Appln. No. 23792209.1-1207 / 4470336 PCT/KR2023005390.

* cited by examiner

| Name | | Frequency Range | SCS for data |
|---|---|---|---|
| FR1 | | 410MHz ~ 7.125GHz | 15kHz, 30kHz, 60kHz |
| FR2 | FR2-1 | 24.25 ~ 52.6GHz | 60kHz, 120kHz |
| | FR2-2 | 52.6 ~ 71GHz | 120kHz, 480kHz, 960kHz |

Figure 1H:
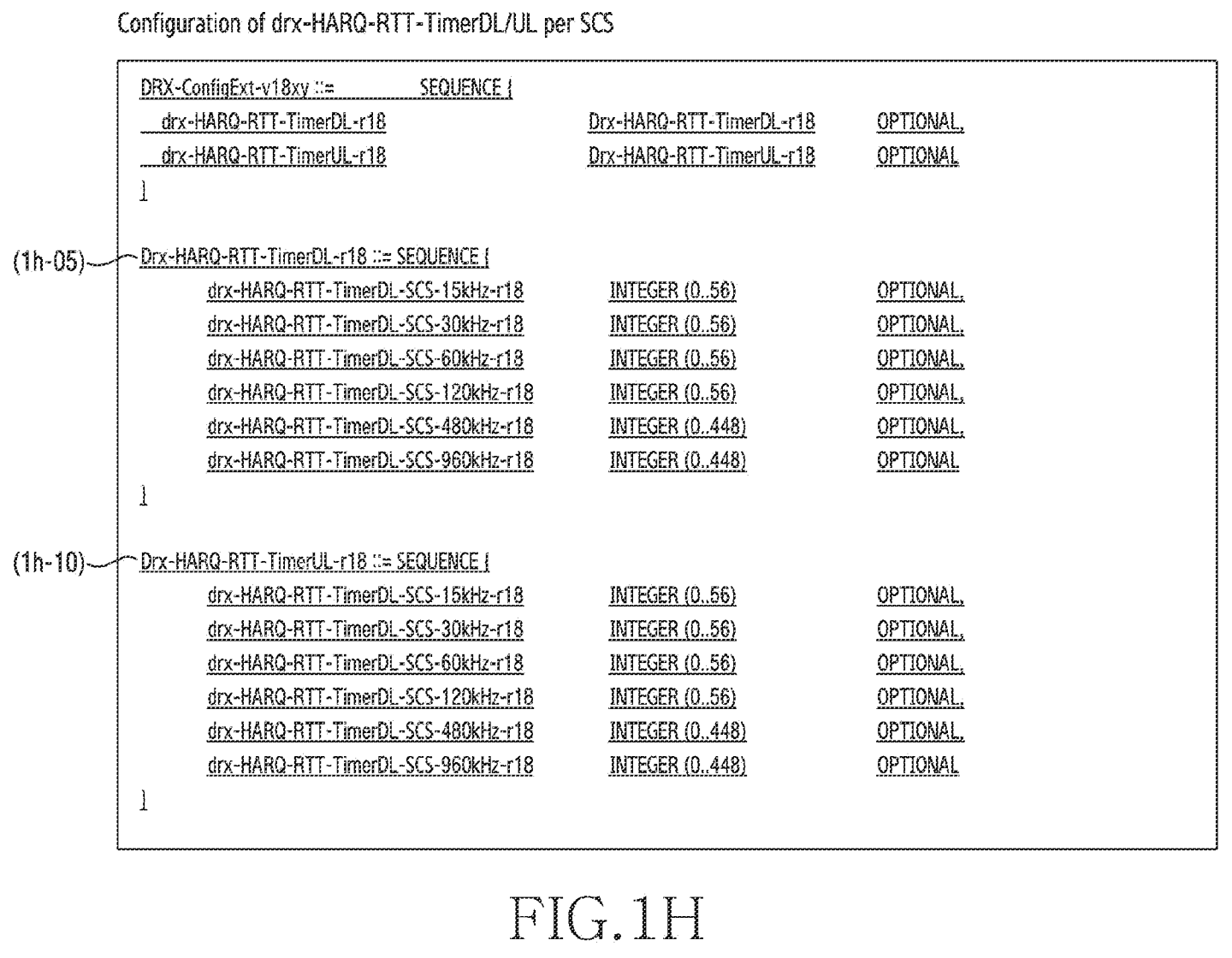

Configuration of drx-HARQ-RTT-TimerDL/UL per SCS

```
DRX-ConfigExt-v18xy ::=          SEQUENCE {
    drx-HARQ-RTT-TimerDL-r18              Drx-HARQ-RTT-TimerDL-r18        OPTIONAL,
    drx-HARQ-RTT-TimerUL-r18              Drx-HARQ-RTT-TimerUL-r18        OPTIONAL
}

Drx-HARQ-RTT-TimerDL-r18 ::= SEQUENCE {
    drx-HARQ-RTT-TimerDL-SCS-15kHz-r18       INTEGER (0..56)        OPTIONAL,
    drx-HARQ-RTT-TimerDL-SCS-30kHz-r18       INTEGER (0..56)        OPTIONAL,
    drx-HARQ-RTT-TimerDL-SCS-60kHz-r18       INTEGER (0..56)        OPTIONAL,
    drx-HARQ-RTT-TimerDL-SCS-120kHz-r18      INTEGER (0..56)        OPTIONAL,
    drx-HARQ-RTT-TimerDL-SCS-480kHz-r18      INTEGER (0..448)       OPTIONAL,
    drx-HARQ-RTT-TimerDL-SCS-960kHz-r18      INTEGER (0..448)       OPTIONAL
}

Drx-HARQ-RTT-TimerUL-r18 ::= SEQUENCE {
    drx-HARQ-RTT-TimerDL-SCS-15kHz-r18       INTEGER (0..56)        OPTIONAL,
    drx-HARQ-RTT-TimerDL-SCS-30kHz-r18       INTEGER (0..56)        OPTIONAL,
    drx-HARQ-RTT-TimerDL-SCS-60kHz-r18       INTEGER (0..56)        OPTIONAL,
    drx-HARQ-RTT-TimerDL-SCS-120kHz-r18      INTEGER (0..56)        OPTIONAL,
    drx-HARQ-RTT-TimerDL-SCS-480kHz-r18      INTEGER (0..448)       OPTIONAL,
    drx-HARQ-RTT-TimerDL-SCS-960kHz-r18      INTEGER (0..448)       OPTIONAL
}
```

Configuration of drx-HARQ-RTT-TimerDL/UL per BWP

Define new DRX-ConfigExt (1i-05)

```
DRX-ConfigExt-v18xy ::=        SEQUENCE {
    drx-HARQ-RTT-TimerDL-r18          INTEGER (0..448)          OPTIONAL
    drx-HARQ-RTT-TimerUL-r18          INTEGER (0..448)          OPTIONAL
}
```

Include the new DRX-ConfigExt in BWP configuration (1i-10)

```
BWP-DownlinkDedicated ::=        SEQUENCE {
    pdcch-Config                 SetupRelease { PDCCH-Config }                          OPTIONAL,   -- Need M
    pdsch-Config                 SetupRelease { PDSCH-Config }                          OPTIONAL,   -- Need M
    sps-Config                   SetupRelease { SPS-Config }                            OPTIONAL,   -- Need M
    radioLinkMonitoringConfig    SetupRelease { RadioLinkMonitoringConfig }             OPTIONAL,   -- Need M
    ...
    [[
    sps-ConfigToAddModList-r16   SPS-ConfigToAddModList-r16                             OPTIONAL,   -- Need N
    sps-ConfigToReleaseList-r16  SPS-ConfigToReleaseList-r16                            OPTIONAL,   -- Need N
    sps-ConfigDeactivationStateList-r16 SPS-ConfigDeactivationStateList-r16             OPTIONAL,   -- Need R
    beamFailureRecoverySCellConfig-r16 SetupRelease {BeamFailureRecoverySCellConfig-r16} OPTIONAL,  -- Cond
SCellOnly
    sl-PDCCH-Config-r16          SetupRelease { PDCCH-Config }                          OPTIONAL,   -- Need M
    sl-V2X-PDCCH-Config-r16      SetupRelease { PDCCH-Config }                          OPTIONAL,   -- Need M
    ]]
    [[
```

(1i-15)

```
    drx-Config-r18               SetupRelease {DRX-ConfigExt-v18xy }                    OPTIONAL,   -- Need M
    ]]
}
```

FIG. 11

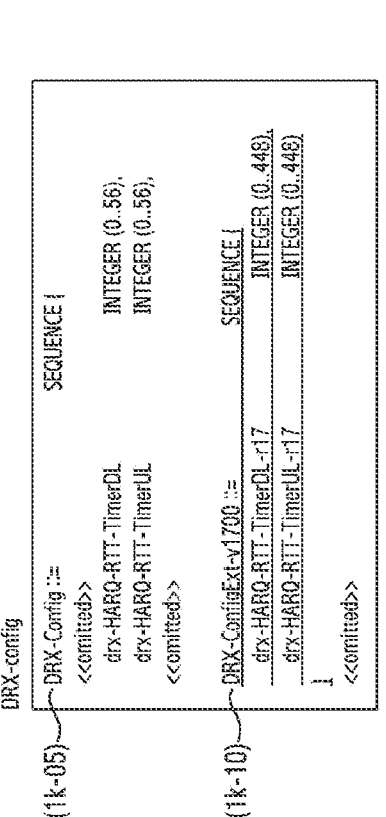

Configuration of drx-HARQ-RTT-TimerDL/UL per SCS group
(Legacy SCS group: 15/30/60/120kHz, New SCS group: 480/960kHz)

DRX-config (1k-05)    DRX-Config ::=          SEQUENCE {
           <<omitted>>
               drx-HARQ-RTT-TimerDL        INTEGER (0..56),
               drx-HARQ-RTT-TimerUL        INTEGER (0..56),
           <<omitted>>

(1k-10)    DRX-ConfigExt-v1700 ::=        SEQUENCE {
               drx-HARQ-RTT-TimerDL-r17        INTEGER (0..449)
               drx-HARQ-RTT-TimerUL-r17        INTEGER (0..449)
           }
           <<omitted>>

DRX-Config field descriptions (1k-15)    drx-HARQ-RTT-TimerDL
           Value in number of symbols of the BWP where the transport block was received. drx-HARQ-RTT-TimerDL-r17 is only applicable for SCS 480 kHz and 960 kHz. If configured, the UE shall ignore drx-HARQ-RTT-TimerDL (without suffix) for SCS 480 kHz and 960 kHz.

drx-HARQ-RTT-TimerUL
           Value in number of symbols of the BWP where the transport block was transmitted. drx-HARQ-RTT-TimerUL-r17 is only applicable for SCS 480 kHz and 960 kHz. If configured, the UE shall ignore drx-HARQ-RTT-TimerUL (without suffix) for SCS 480 kHz and 960 kHz.

FIG. 1K

METHOD AND APPARATUS FOR ENHANCING DRX CONFIGURATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0050060, filed on Apr. 22, 2022, in the Korean Intellectual Property Office, the disclosure of which is incorporated by reference herein in its entirety.

BACKGROUND

1. Field

The disclosure relates to a communication method of a wireless communication. More particularly, the disclosure relates to a method and an apparatus for enhancing a discontinue reception (DRX) configuration.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively providing a service in a mobile communication system.

Another aspect of the disclosure is to provide an apparatus and a method for effectively providing a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving configuration information regarding a discontinuous reception (DRX) from a base station, starting a first timer based on the configuration information, and monitoring a physical downlink control channel (PDCCH) based on the first timer, wherein the configuration information includes a first timer value for a first subcarrier spacing (SCS) group and a first timer value for a second SCS group.

The first SCS group includes 15 KHz SCS, 30 KHz SCS, 60 KHz SCS, and 120 KHz SCS, and the second SCS group includes 480 KHz SCS and 960 KHz SCS.

The first timer value for the first SCS group is not applied for the second SCS group, in case that the first timer value for the second SCS group is configured.

The first timer includes drx-HARQ-RTT-TimerUL timer and a drx-HARQ-RTT-TimerDL timer.

The method further includes receiving, from the base station, a request for information on whether the UE can separately configure the first timer value for the first SCS group and the second SCS group, and providing, to the base station, information on whether the UE can separately configure the first timer value for the first SCS group and the second SCS group.

In accordance with another aspect of the disclosure, a method performed by a base station in a wireless communication system is provided. The method includes transmitting configuration information regarding a discontinuous reception (DRX) to a user equipment (UE), and transmitting control information on a physical downlink control channel (PDCCH) based on the configuration information, wherein the configuration information includes a first timer value for a first subcarrier spacing (SCS) group and a first timer value for a second SCS group.

The first SCS group includes 15 KHz SCS, 30 KHz SCS, 60 KHz SCS, and 120 KHz SCS, and the second SCS group includes 480 KHz SCS and 960 KHz SCS.

The first timer value for the first SCS group is not applied for the second SCS group, in case that the first timer value for the second SCS group is configured.

The first timer includes drx-HARQ-RTT-TimerUL timer and a drx-HARQ-RTT-TimerDL timer.

The method further includes transmitting, to the UE, a request for information on whether the UE can separately configure the first timer value for the first SCS group and the second SCS group, and receiving, from the UE, information on whether the UE can separately configure the first timer value for the first SCS group and the second SCS group.

In accordance with another aspect of the disclosure, a user equipment (UE) in a wireless communication system is provided. The UE includes at least one transceiver, and at least one processor operatively coupled with the at least one transceiver, wherein the at least one processor is configured to receive configuration information regarding a discontinuous reception (DRX) from a base station, start a first timer based on the configuration information, monitor a physical downlink control channel (PDCCH) based on the first timer, wherein the configuration information includes a first timer value for a first subcarrier spacing (SCS) group and a first timer value for a second SCS group.

The first SCS group includes 15 KHz SCS, 30 KHz SCS, 60 KHz SCS, and 120 KHz SCS, and the second SCS group includes 480 KHz SCS and 960 KHz SCS.

The first timer value for the first SCS group is not applied for the second SCS group, in case that the first timer value for the second SCS group is configured.

The first timer includes drx-HARQ-RTT-TimerUL timer and a drx-HARQ-RTT-TimerDL timer.

The at least one processor is further configured to receive, from the base station, a request for information on whether the UE can separately configure the first timer value for the first SCS group and the second SCS group, and provide, to the base station, information on whether the UE can separately configure the first timer value for the first SCS group and the second SCS group.

In accordance with another aspect of the disclosure, a base station in a wireless communication system is provided. The base station includes at least one transceiver, and at least one processor operatively coupled with the at least one transceiver, wherein the at least one processor is configured to transmit configuration information regarding a discontinuous reception (DRX) to a user equipment (UE), and transmit control information on a physical downlink control channel (PDCCH) based on the configuration information, wherein the configuration information includes a first timer value for a first subcarrier spacing (SCS) group and a first timer value for a second SCS group.

The first SCS group includes 15 KHz SCS, 30 KHz SCS, 60 KHz SCS, and 120 KHz SCS, and the second SCS group includes 480 KHz SCS and 960 KHz SCS.

The first timer value for the first SCS group is not applied for the second SCS group, in case that the first timer value for the second SCS group is configured.

The first timer includes drx-HARQ-RTT-TimerUL timer and a drx-HARQ-RTT-TimerDL timer.

The at least one processor is further configured to transmit, to the UE, a request for information on whether the UE can separately configure the first timer value for the first SCS group and the second SCS group, and receive, from the UE, information on whether the UE can separately configure the first timer value for the first SCS group and the second SCS group.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G is a view illustrating names and ranges of frequency areas defined in NR, and SCS values usable in each area according to an embodiment of the disclosure;

FIG. 1H is a view illustrating an example of a method of configuring drx-HARQ-RTT-TimerUL/DL for each SCS according to an embodiment of the disclosure;

FIG. 1I is a view illustrating an example of a method of configuring drx-HARQ-RTT-TimerUL/DL for each BWP according to an embodiment of the disclosure;

FIG. 1K is a view illustrating an example of a method of configuring drx-HARQ-RTT-TimerUL/DL for each SCS group according to an embodiment of the disclosure;

Throughout the drawings, it should be noted that like reference numbers are used to depict the same or similar elements, features, and structures.

DETAILED DESCRIPTION

Figure 1A:
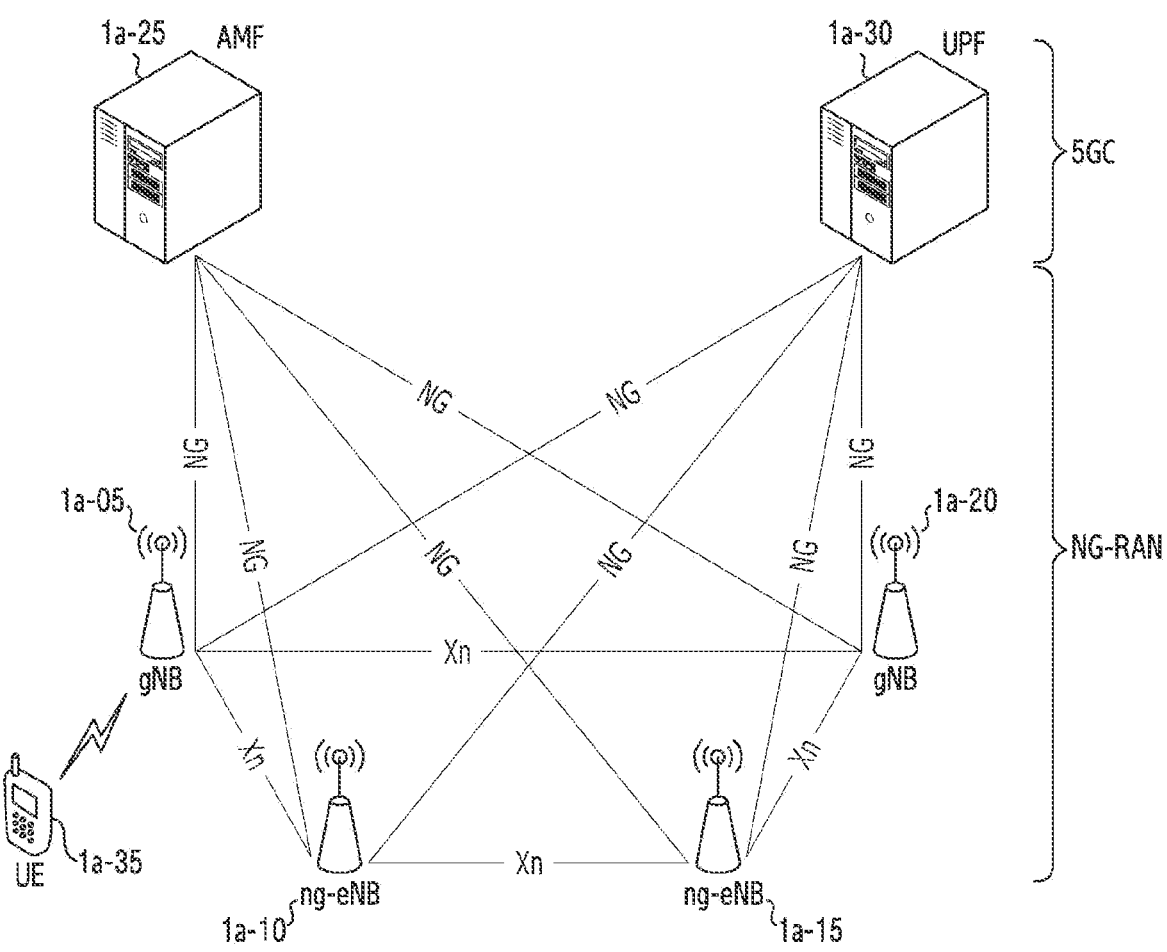
FIG. 1A is a view illustrating a structure of a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure, and methods for achieving the same will be apparent by referring to embodiments, which will be described in detail below along with the accompanying drawings. However, the disclosure is not limited to embodiments disclosed hereinbelow, and may be embodied in many different forms. Embodiments disclosed hereinbelow are provided only to make the disclosure thorough and complete and fully convey the scope of the disclosure to those of ordinary skill in the art, and the disclosure may be defined only by the scope of the appended claims. Throughout the specification, the same reference numerals indicate the same components.

It will be understood that each block of the process flowcharts described hereinbelow and combinations of the flowcharts may be performed by computer program instructions. These computer program instructions may be loaded into a processor of a generic-purpose computer, a special computer, or other programmable data processing equipment. The instructions performed by the processor of the computer or other programmable data processing equipment may generate a means for performing functions explained in the block(s) of the flowcharts. The computer program instructions may be stored in a computer usable or computer readable memory which is directed at a computer or other programmable data processing equipment in order to implement a function in a specific method. Accordingly, the instructions stored in the computer usable or computer readable memory may produce a manufacturing item including an instruction means for performing functions explained in the block(s) of the flowcharts. The computer program instructions may be loaded on a computer or other programmable data processing equipment. Accordingly, a series of operation steps may be performed on the computer or other programmable data processing equipment to generate a process to be executed by the computer, and the instructions performing the computer or other programmable data processing equipment may provide operations for executing functions explained in the block(s) of the flowcharts.

In addition, each block may indicate a part of a module, a segment or a code including one or more executable instructions for executing a specified logical function(s). It should be noted that in some alternative examples, functions mentioned in blocks may be generated out of sequence. For example, two blocks which are successively illustrated may be performed substantially at the same time, or may be performed in the inverse order according to their corresponding functions.

The term "unit" used in the embodiments refers to a software component or a hardware component such as a field programmable gate array (FPGA) or an application specific integrated circuit (ASIC), and the "unit" performs a certain role. However, the "unit" is not limited to software or hardware, The "unit" may be configured to exist in a storage medium which may address, and may be configured to reproduce one or more processors. For example, the "unit" may include components such as software components, object-oriented software components, class components and task components, and processes, functions, attributes, procedures, sub-routines, segments of a program code, drivers, firmware, microcode, circuit, data, database, data structures, tables, arrays, and parameters. Functions provided in the components and the "units" may be coupled with fewer components and "units" or may further be divided into additional components and "units." In addition, the components and the "units" may be implemented to reproduce one or more CPUs in a device or a security multimedia card. In addition, in an embodiment, the "unit" may include one or more processors.

In explaining the disclosure hereinbelow, detailed descriptions of well-known functions or configurations will be omitted since they would unnecessarily obscure the subject matters of the disclosure. Hereinafter, embodiments of the disclosure will be described with reference to the accompanying drawings.

As used herein, a term for identifying an access node, terms indicating network entities, terms indicating messages, a term indicating an interface between network entities, terms indicating a variety of identification information are merely examples for the convenience of explanation. Accordingly, the disclosure is not limited to terms described below, and other terms having the same technical meanings may be used to indicate these objects.

In the following descriptions, a physical channel and a signal may be interchangeably used with data or a control signal. For example, a physical downlink shared channel (PDSCH) refers to a physical channel through which data is transmitted, but the term PDSCH may be used to indicate data. That is, in the disclosure, the expression 'transmitting a physical channel' may be interpreted as the same as the expression 'transmitting data or a signal through a physical channel'.

In the disclosure, "higher signaling" refers to a signal transmission method by which a base station transmits a signal to a terminal by using a downlink data channel of a physical layer, or a terminal transmits a signal to a base station by using an uplink data channel of a physical layer. The higher signaling may be understood as radio resource control (RRC) signaling or a media access control (MAC) control element (CE).

In the disclosure, terms and names defined in 3$^{rd}$ generation partnership project new radio (3GPP NR) or 3$^{rd}$ generation partnership project long term evolution (3GPP LTE) are used for the convenience of explanation. However, the disclosure is not limited by the terms and names, and may be equally applied to systems conforming to other standards. In the disclosure, gNB may be interchangeably used with eNB for the convenience of explanation. That is, a base station explained as eNB may indicate gNB. In addition, the term "terminal" may indicate not only a mobile phone, a machine type communications (MTC) device, an NB-IoT device, a sensor, but also other wireless communication devices.

A base station, which will be described hereinbelow, refers to an entity that performs resource allocations of a terminal, and may be at least one of a gNode B (gNB), an eNode B (eNB), a Node B, a base station (BS), a radio access unit, a base station controller, or a node over a network. A terminal may include user equipment (UE), a mobile station (MS), a cellular phone, a smartphone, a computer, or a multimedia system performing a communication function. Of course, the disclosure is not limited to the above-described examples.

In particular, the disclosure may be applied to 3GPP NR (5th generation mobile communication standards). In addition, the disclosure may be applied to intelligent services (for example, a smart home, a smart building, a smart city, a smart car or connected car, health care, digital education, retail business, a security and safety-related service, etc.) which is based on 5G communication technology and IoT-related technology. In the disclosure, eNB may be interchangeably used with gNB. That is, a base station explained as eNB may indicate gNB. In addition, the term "terminal" may indicate not only a mobile phone, NB-IoT devices, sensors, but also other wireless communication devices.

Beyond the initial function of providing a voice-oriented service, a wireless communication system is developing into a broadband wireless communication system which provides a packet data service of high-speed, high quality like communication standards, such as high speed packet access (HSPA) of 3GPP, long term evolution (LTE) or evolved universal terrestrial radio access (E-UTRA), LTE-Advanced (LTE-A), LTE-Pro, high rate packet data of 3GPP2, ultra mobile broadband (UWB), and 802.16e of IEEE.

In an LTE system, which is a representative example of the broadband wireless communication system, an orthogonal frequency division multiplexing (OFDM) scheme may be employed in a downlink (DL), and a single carrier-frequency division multiple access (SC-FDMA) scheme may be employed in an uplink (UL). The uplink refers to a wireless link through which a terminal (user equipment (UE) or a mobile station (MS)) transmits data or a control signal to a base station (eNode B or a base station (BS)), and the downlink refers to a wireless link through which a base station transmits data or a control signal to a terminal. In addition, the above-described multiple access schemes may assign or manage time-frequency resources for carrying and transmitting data or control information for each user not to overlap one another, that is, to establish orthogonality, and thereby distinguish data or control information of each user.

A 5G communication system which is a post-LTE communication system should support a service satisfying various requirements simultaneously so as to be able to freely reflect various requirements of a user and a service provider. Services which are considered for the 5G communication system may include enhanced mobile broadband (eMBB), massive machine type communication (mMTC), ultra-reliability low latency communication (URLLC).

According to some embodiments, eMBB aims at providing a high data transmission speed which is more enhanced than a data transmission speed supported by existing LTE, LTE-A, or LTE-Pro. For example, in a 5G communication system, eMBB should be able to provide a peak data rate of 20 Gbps in a downlink and to provide a peak data rate of 10 Gbps in an uplink from the point of view of one base station. In addition, the 5G communication system should provide an increased user perceived data rate of a terminal, while providing the peak data rate. In order to meet the requirements described above, there may be a demand for enhancement of various transmission and reception technologies including an enhanced multi input multi output (MIMO) transmission technology. In an LTE system, signals are transmitted by using a maximum transmission bandwidth of 20 MHz in a 20 GHz band, whereas in the 5G communication system, a frequency bandwidth larger than 20 MHz is used in a frequency band of 3-6 GHz or 6 GHz or more, so that the data transmission rate required in the 5G communication system may be satisfied.

At the same time, mMTC may be considered in order to support an application service such as Internet of thing (IoT) in the 5G communication system. mMTC may require support of access by massive terminals within a cell, enhanced coverage of a terminal, an increased battery time, reduction of a cost of a terminal in order to provide IoT efficiently. Since the IoT is attached to various sensors and various devices to provide a communication function, the IoT should be able to support many terminals (for example, 1,000,000 terminals/km2) within a cell. Since terminals supporting mMTC are likely to be positioned in a shaded area that is not covered by a cell, such as a basement of a building, due to characteristics of a service, a broader coverage may be required in comparison to other services provided by the 5G communication system. Since terminals supporting mMTC should be configured with low-priced terminals, and there may be difficulty in replacing a battery of a terminal frequently, there may be a need for a long battery life time, for example, a battery life of 10-15 years.

Lastly, URLLC is a cellular-based wireless communication service which is used for a specific purpose (mission-critical), and may be used for services used for remote control of a robot or a machinery, industrial automation, an unmanned aerial vehicle, remote health care, an emergency alert. Accordingly, communication provided by URLLC should provide very low latency and very high reliability. For example, services supporting URLLC should satisfy air interface latency shorter than 0.5 millisecond, and simultaneously, should satisfy requirements of a packet error rate lower than or equal to 10-5. Accordingly, a 5G system should provide a shorter transmit time interval (TTI) than those of other services in order to provide a service supporting URLLC, and simultaneously, should allocate broad resources in a frequency band in order to guarantee reliability of a communication link.

The three services considered in the 5G communication system, that is, eMBB, URLLC, mMTC, may be multiplexed in one system and may be transmitted. In this case, different transmission and reception techniques and transmission and reception parameters may be used between services in order to meet the different requirements of the respective service. However, the above-described mMTC, URLLC, eMBB are just different types of services, and a service type to which the disclosure is applicable is not limited to the above-described examples.

In the following descriptions, embodiments of the disclosure will be described by referring to LTE, LTE-A, LTE Pro or 5G (or NR, next-generation mobile communication) systems by way of an example, but embodiments of the disclosure may be applied to other communication systems having similar technical background or channel types. In addition, embodiments of the disclosure may be applied to other communication systems through some modification within the scope without departing from the scope of the disclosure, based on determination of a person skilled in the art.

The disclosure relates to a method and an apparatus for optimizing DRX operation and configuration in a next-generation wireless communication system. More specifically, the disclosure relates to a method and an apparatus for optimizing existing DRX operation and configuration for an efficient power saving operation of a terminal when there are bandwidth parts (BWPs) using different sub carrier spacing (SCS) values in 3GPP 5G NR.

The disclosure provides a method for configuring appropriate drx-HARQ-RTT-TimerUL/DL and drx-RetransmissionTimerUL/DL parameters, separately, according to a SCS (according to a symbol duration) used in each BWP for an efficient DRX operation of a terminal. Specifically, the disclosure provides a method whereby a base station configures parameter values associated with DRX for each SCS, each BWP, each DRX group, each SCS group, a method whereby a terminal reports to a base station as to whether the terminal supports the method of configuring for each SCS, each BWP, each DRX group, each SCS group, and a method whereby a terminal applies a parameter configured for each SCS, each BWP, each DRX group, each SCS group and performs DRX.

According to the disclosure, a terminal may report to a base station as to whether the terminal supports a method of configuring drx-HARQ-RTT-TimerUL/DL and drx-RetransmissionTimerUL/DL parameters for each SCS, each BWP, each DRX group, each SCS group, through UE capability information. The base station may determine a DRX con-figuration method to deliver to the terminal with reference to the UE capability information reported by the terminal, and, when the terminal supports such a configuring method, the base station may configure separate drx-HARQ-RTT-TimerUL/DL and drx-RetransmissionTimerUL/DL parameter values for each SCS, each BWP, each DRX group, each SCS group. The terminal and the base station may configure and apply drx-HARQ-RTT-TimerUL/DL and drx-RetransmissionTimerUL/DL values corresponding to respective BWPs or SCS values corresponding to the BWPs during a DRX operation, so that an unnecessary delay time may be reduced during the DRX operation.

FIG. 1A is a view illustrating a structure of an NR system according to an embodiment of the disclosure.

Referring to FIG. 1A, a wireless communication system may include a plurality of base stations (for example, gNB 1a-05, ng-eNB 1a-10, ng-eNB 1a-15, gNB 1a-20), an access and mobility management function (AMF) 1a-25, and a user plane function (UPF) 1a-30. The wireless communication system is not limited to the configuration illustrated in FIG. 1A, and may include more or less components.

According to an embodiment of the disclosure, a user terminal (user equipment) (hereinafter, referred to as UE or a terminal) 1a-35 may connect to an external network through the base stations (for example, gNB 1a-05, ng-eNB 1a-10, ng-eNB 1a-15, gNB 1a-20) and the UPF 1a-30.

Referring to FIG. 1A, the base stations (for example, gNB 1a-05, ng-eNB 1a-10, ng-eNB 1a-15, gNB 1a-20) may provide radio access to terminals which connect to a network as access nodes of a cellular network. That is, the base stations (for example, gNB 1a-05, ng-eNB 1a-10, ng-eNB 1a-15, gNB 1a-20) may collect state information of terminals, such as a buffer state, an available power state, a channel state, and may schedule in order to service traffic of users, and may support a connection between the terminals and a core network (CN) (in particular, a CN of NR may be referred to as 5GC).

Referring to FIG. 1A, gNB 1a-15, 1a-20 may control a plurality of cells, and may apply an adaptive modulation & coding (AMC) scheme to determine a modulation scheme and a channel coding rate according to a channel state of the terminal.

The core network may be a device which is responsible for not only a mobility management function for a terminal but also various control functions, and may be connected with the plurality of base stations. In addition, 5GC may interlock with an existing LTE system.

In a wireless communication system, a user plane (UP) related to transmission of real user data and a control plane (CP) related to connection management may be separately configured, and gNB 1a-05 and gNB 1a-20 of FIG. 1A may use UP and CP technologies defined in the NR technology, and ng-eNB 1a-10 and ng-eNB 1a-15 may use UP and CP technologies defined in the LTE technology although they are connected to 5GC.

The AMF 1a-25 may be a device which is responsible for not only a mobility management function for a terminal but also various control functions, and may be connected with the plurality of base stations, and the UPF 1a-30 may refer to a kind of gateway device providing data transmission. An NR wireless communication system may include a session management function (SMF) although it is not illustrated in FIG. 1A. The SMF may manage a packet data network connection such as a protocol data unit (PDU) session to be provided to a terminal.

Figure 1B:
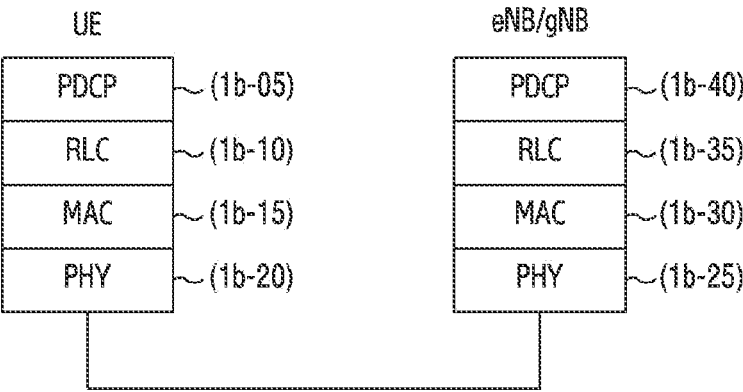
FIG. 1B is a view illustrating a wireless protocol structure in long term evolution (LTE) and NR systems according to an embodiment of the disclosure.

FIG. 1B is a view illustrating a wireless protocol structure in LTE and NR systems according to an embodiment of the disclosure.

Referring to FIG. 1B, a wireless protocol of an LTE system may include, in a terminal and an eNB, a packet data convergence protocol (PDCP) 1b-05, 1b-40, a radio link control (RLC) 1b-10, 1b-35, a medium access control (MAC) 1b-15, 1b-30, and a physical (PHY) layer 1b-20, 1b-25, respectively.

The PDCP 1b-05, 1b-40 may be responsible for IP header compression/decompression operations, and may provide in-sequence, out-of-sequence delivery functions and may provide reordering, duplicate detection, retransmission, ciphering and deciphering functions. However, the PDCP is not limited to the above-described examples.

The RLC 1b-10, 1b-35 may reconstruct a PDCP PDU with an appropriate size, and may provide in-sequence, out-of-sequence delivery functions, and may provide an ARQ function, concatenation, segmentation, and reassembly functions, a re-segmentation function, a reordering function, a duplicate detection function, an error detection function. However, the RLC is not limited to the above-described examples.

The MAC 1b-15, 1b-30 may be connected with various RLC layer devices constructed in one terminal, and may perform operations of multiplexing RLC PUDs into MAC PDUs and demultiplexing RLC PUDs from MAC PDUs, and may provide a mapping function, a scheduling information reporting function, a hybrid automatic repeat and request (HARQ) function, a function of handling a priority between logical channels, a function of handling a priority between terminals, an MBMS service identification function, a transport format selection function, a padding function. The MAC is not limited to the above-described examples.

The PHY layer 1b-20, 1b-25 may perform operations of channel coding and modulating upper layer data, making an OFDM symbol and transmitting via a wireless channel, or operations of demodulating an OFDM symbol received through a wireless channel, channel decoding, and delivering to a higher layer. In addition, a HARQ may be used for additional error correction in the physical layer, and a reception end may transmit information on whether to receive a packet transmitted by a transmission end by using 1 bit. This information may be referred to as HARQ ACK/NACK information. Downlink HARQ ACK/NACK information as to uplink data transmission may be transmitted through a physical hybrid-ARQ indicator channel (PHICH) in the case of LTE. In NR, an asynchronous HARQ may be applied. Accordingly, in the case of NR, it may be determined whether retransmission is required or new transmission should be performed through scheduling information of a terminal in a physical dedicated control channel (PDCCH), which is a channel for transmitting downlink/uplink resource allocation. Uplink HARQ ACK/NACK information as to downlink data transmission may be transmitted through a physical uplink control channel (PUCCH) or a physical uplink shared channel (PUSCH). The PUCCH is normally transmitted through uplink of a PCell which will be described, but, when the base station supports a terminal, the PUCCH may be additionally transmitted to a secondary cell (SCell), which will be described below. The SCell is referred to as a PUCCH SCell.

A radio resource control (RRC) layer may exist above the PDCP layer of the terminal and the base station, and the RRC layers may exchange a configuration control message related to access, measurement for the control of radio resources.

The physical layer may include one or a plurality of frequencies/carriers, and a technology for configuring and using a plurality of frequencies simultaneously is referred to as a carrier aggregation technology (hereinafter, referred to as CA). Compared to a prior technology which uses one carrier for communication between a terminal (or UE) and a base station (E-UTRAN NodeB, eNB), the CA technology may additionally use a primary carrier and one or a plurality of sub carriers, thereby significantly increasing an amount of data to be transmitted by the number of sub carriers. In LTE, a cell within a base station that uses a primary carrier may be referred to a primary cell (PCell), and a cell within a base station that uses a sub carrier may be referred to as a secondary cell (SCell).

The wireless protocol of NR may further include a service data adaptation protocol (SDAP) although it is not illustrated. The SDAP layer may provide a function of transferring user data, a function of mapping between a QoS flow and a data bearer for both uplink and downlink, a function of marking a QoS flow ID for uplink and downlink, and a function of mapping a reflective QoS flow to a data bearer for uplink SDAP PDUS. The SDAP is not limited to the above-described examples.

Figure 1C:
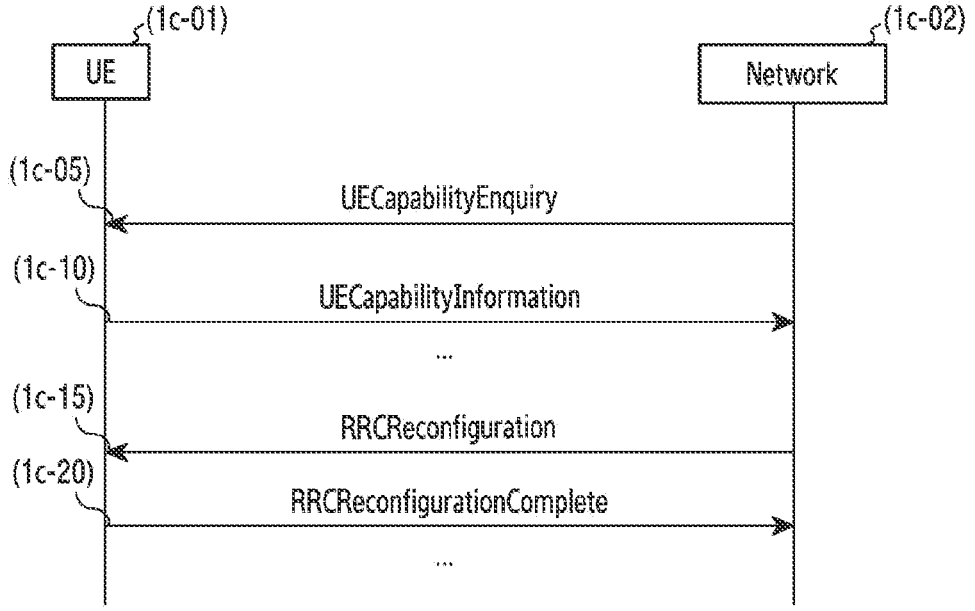
FIG. 1C is a view illustrating a procedure of exchanging DRS-related UE capability information and connection configuration information between a terminal and a base station according to an embodiment of the disclosure.

FIG. 1C is a view illustrating a procedure of exchanging UE capability information and connection configuration information related to DRX between UE and a base station according to an embodiment of the disclosure.

Referring to FIG. 1C, UE 1c-01 may be connected to a network (a base station or a serving base station) 1c-02 (hereinafter, a base station), and in this case, the UE1 may report UE auxiliary information related to a DRX operation to the base station, and the base station may configure a DRX operation of the UE based on the UE auxiliary information.

At operation 1c-05, the base station 1c-02 may transmit a UE capability enquiry (UECapabilityEnquiry) message for requesting a capability report to the UE 1c-01. The base station 1c-02 may include a request for UE capability for each RAT type in the UECapabilityEnquiry message. The request for each RAT type may include requested frequency band information. In addition, the UECapabilityEnquiry message may request a plurality of RAT types in one RRC message container. Alternatively, the base station 1c-02 may transmit the UECapabilityEnquiry message including the request for each RAT type to the UE 1c-01 multiple times. That is, the UECapabilityEnquiry message may be transmitted once or may be transmitted multiple times at operation 1c-05.

In addition, at operation 1c-05, when the base station 1c-02 requests the UE 1c-01 to generate a UECapabilityInformation message, the request may include filtering information for indicating a condition and a restriction. Even when the UE supports many capabilities, it may be useless to receive a report on capability of UE if the base station is not able to process and support the UE capability. Therefore, the base station may restrict the UE capability reported by the UE in order to receive only UE capability information that is necessary for the base station. In this way, the UE capability that the UE reports is restricted by the base station, so that a size of the UECapabilityInformation message reported by the UE may be reduced.

At operation 1c-10, the UE 1c-01 may construct a UE capability information (UECapabilityInformation)

message corresponding to the UECapabilityEnquiry message, and may match the same as a response to the UECapabilityEnquiry and may report to the base station 1c-02. In a next-generation mobile communication system, UE capability regarding NR, LTE, MR-DC and EN-DC may be requested. For reference, the UECapabilityEnquiry message may be transmitted initially after the UE connects and the base station recognizes the UE. However, the base station may request the UE capability from the UE under any condition when necessary.

In addition, the UECapabilityInformation message at operation 1c-10 may include information regarding UE capability related to a UE DRX operation. At operation 1c-15, the base station may configure a DRX operation that is necessary within a range supportable by the UE, based on the information on the UE capability related to the DRX operation.

At operation 1c-15, the base station 1c-02 may transmit necessary connection configuration information to the UE 1c-01. In this case, the base station may configure a DRX operation that may be performed by the UE, based on the UE capability information reported by the UE at operation 1c-10.

At operation 1c-20, the UE 1c-01 may inform the base station 1c-02 that the configuration information is applied after receiving the configuration information transmitted by the base station 1c-02 at operation 1c-15.

Figure 1D:
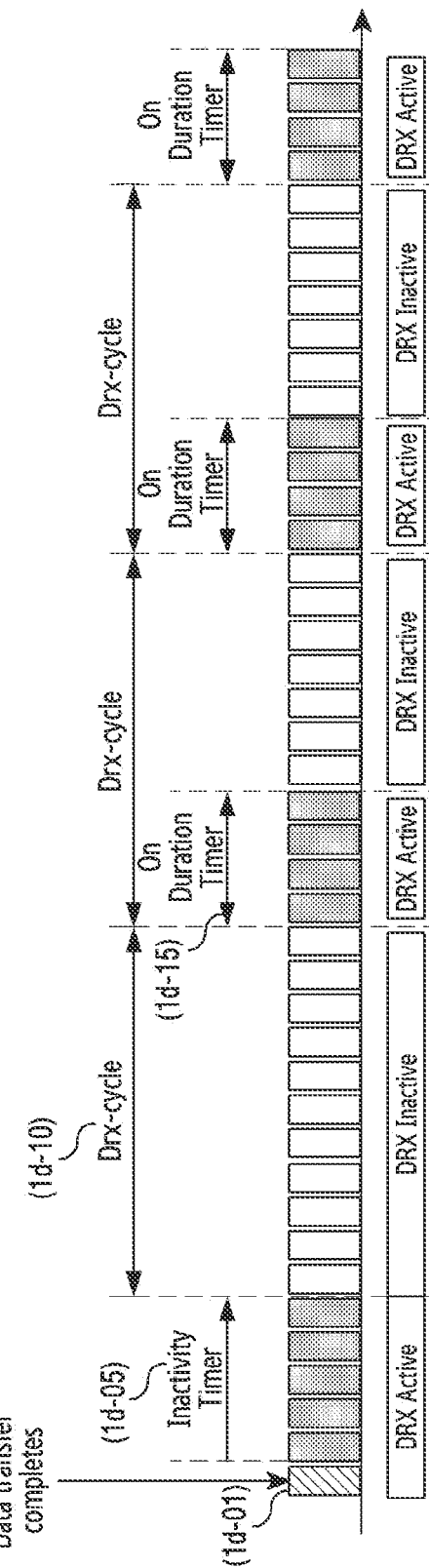
FIG. 1D is a view illustrating a DRX operating method of a terminal according to an embodiment of the disclosure.

FIG. 1D is a view illustrating a DRX operating method of UE according to an embodiment of the disclosure.

Referring to FIG. 1D, UE may perform a DRX operation (connected mode DRX, hereinafter, referred to as C-DRX) in a connection mode according to configuration of a base station. When the UE completes transmission and reception of a last packet, the UE starts an inactivity timer 1d-05 at a time 1d-01 at which the transmission and reception of the last packet is completed. Thereafter, when the inactivity timer 1d-05 is expired, the UE may switch from a DRX active state (a state in which the UE continues monitoring a PDCCH to identify a control signal transmitted by the base station) to a DRX inactive state (a state in which the UE does not monitor the PDCCH to save power). After switching to the DRX inactive state, the UE may periodically switch to the DRX active state according to a DRX cycle 1d-10 (drx-shortCycle or drx-longCycle) configured by the base station. After switching to the DRX active state, the UE may monitor the PDCCH for a predetermined time according to an on duration timer 1d-15 value configured by the base station, and may receive control signals transmitted by the base station. When data transmission and reception occur in the DRX active state, the UE may restart the inactivity timer, and, when the inactivity timer is expired, the UE may perform the C-DRX operation again. When data transmission and reception do not occur until the on duration timer is expired, the UE may enter the DRX inactive state again and may wait until the next drx-cycle.

FIG. IE is a view illustrating an example of use of drx-HARQ-RTT-TimerUL/DL and drx-RetransmissionTimerUL/DL values according to an embodiment of the disclosure.

Figure 1E:
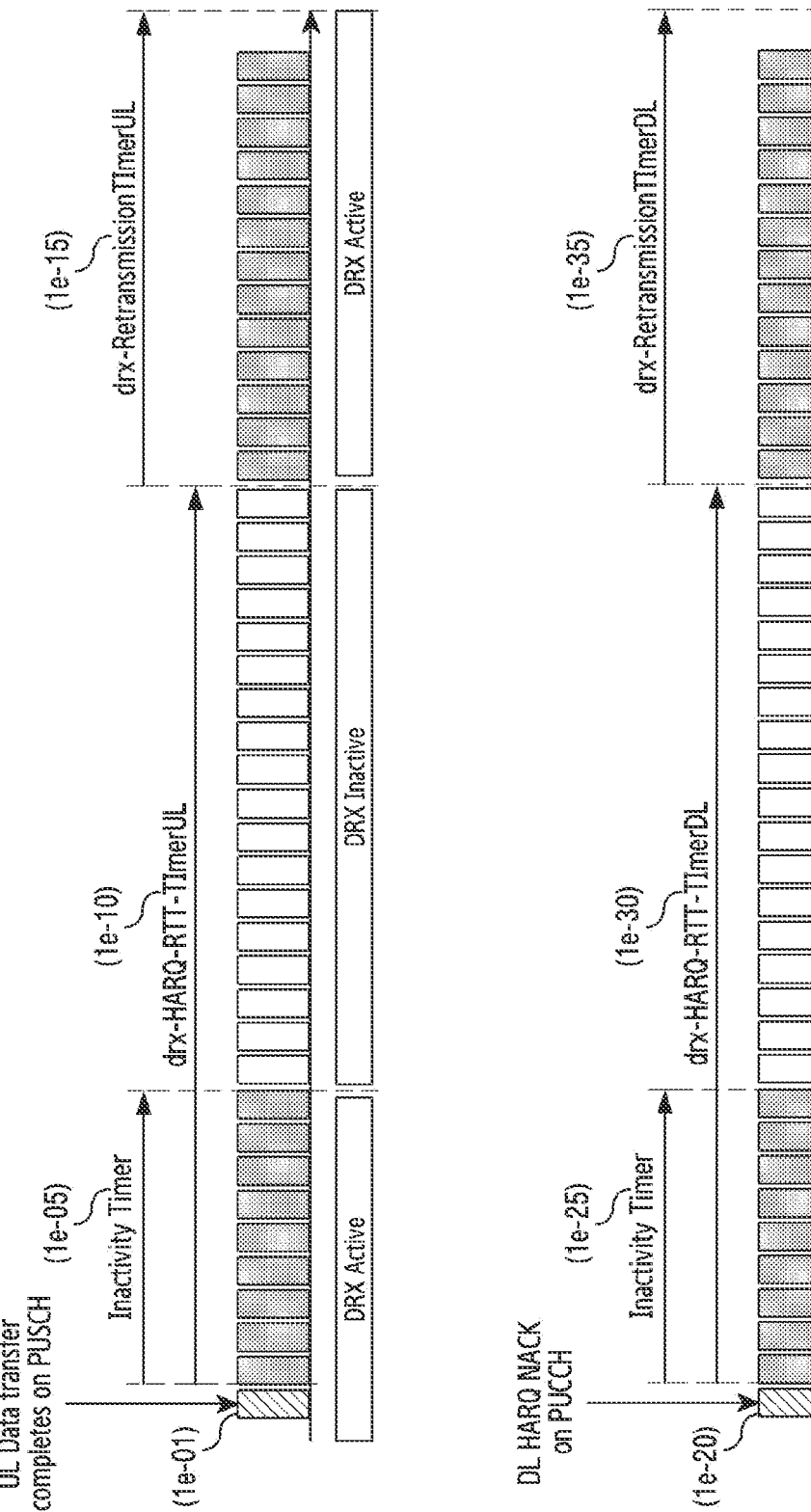
FIG. 1E is a view illustrating an example of use of drx-HARQ-RTT-Timer UL/DL and drx-Retransmission-TimerUL/DL values according to an embodiment of the disclosure.

Referring to FIG. 1E, UE may start an inactivity timer 1e-05 and drx-HARQ-RTT-TimerUL 1e-10 at a time 1e-01 at which the UE transmits a last UL packet on a PUSCH in a DRX active state. Thereafter, when the inactivity timer 1e-05 is expired, the UE may shift to a DRX inactive state and may not monitor a PDCCH. Thereafter, when drx- HARQ-RTT-TimerUL is expired, the UE may determine that the base station completes processing of the uplink transmission packet, which is transmitted on the PUSCH at the time 1e-01 at which the UE transmits the last UL packet, and the base station is ready to transmit a corresponding HARQ NACK, and may shift to a DRX active state and may monitor the PDCCH during drx-RetransmissionTimerUL 1e-15. When the base station does not transmit the HARQ NACK during drx-RetransmissionTimerUL 1e-15, the UE may enter the DRX inactive state again and may perform the C-DRX operation.

The UE may start an inactivity timer 1e-25 and drx-HARQ-RTT-TimerDL 1e-30 at a time 1e-20 at which the UE receives last downlink data on a PDSCH and transmits a HARQ NACK corresponding to the downlink data in a DRX active state. Thereafter, when the inactivity timer 1e-25 is expired, the UE may shift to a DRX inactive state and may not monitor the PDCCH. Thereafter, when drx-HARQ-RTT-TimerDL 1e-30 is expired, the UE may determine that the base station completes processing of the HARQ NACK, which is transmitted on the PUCCH at the time 1e-20 at which the UE transmits the HARQ NACK corresponding to the downlink data, and the base station is ready to retransmit corresponding data on the PDSCH, and may shift to a DRX active state and may monitor the PDCCH during drx-RetransmissionTimerDL 1e-35. When the base station does not transmit scheduling information regarding retransmission during drx-RetransmissionTimerDL 1e-35, the UE may enter the DRX inactive state again and may perform the C-DRX operation.

According to an embodiment, the base station may configure drx-HARQ-RTT-TimerUL/DL and RetransmissionTimerUL/DL parameters to be included in a DRX-Config information element (IE). A drx-HARQ-RTT-TimerUL/DL value may be configured on a symbol basis, and RetransmissionTimerUL/DL may be configured on a slot basis. The DRX-Config IE may be configured on a CellGroup basis, and may be included in a MAC-CellGroupConfig IE in the CellGroupConfig IE. Accordingly, when the UE operates in all BWPs configured in all cells included in the cell group, the same drx-HARQ-RTT-TimerUL/DL and RetransmissionTimerUL/DL values may be used.

In this case, when SCS values used in respective BWPs are different, an absolute time length of drx-HARQ-RTT-TimerUL/DL and RetransmissionTimerUL/DL applied in each BWP may be different since symbols and slots lengths are different (that is, a time from when the UE goes into a DRX inactive state in order to wait for a processing time taken for the base station to prepare necessary downlink transmission after processing uplink transmission to when the UE returns to the DRX active state may vary according to a BWP.

Figure 1F:
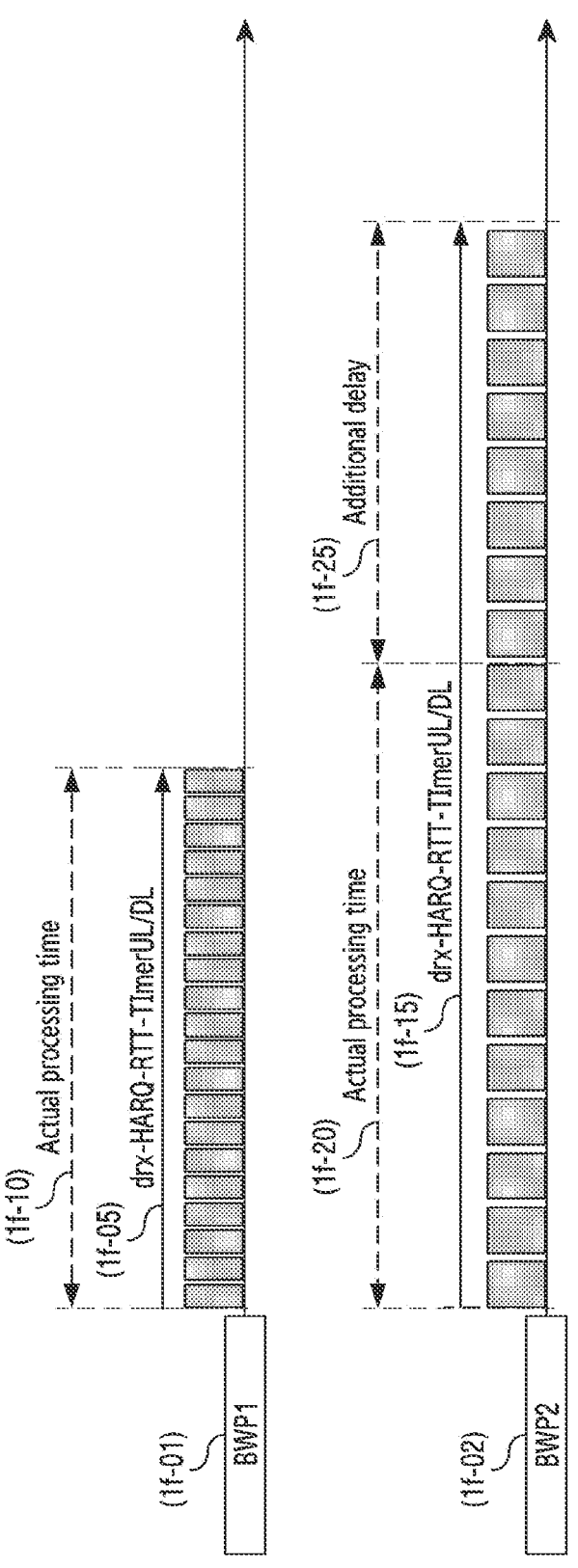
FIG. 1F is a view illustrating a problem arising when BWPs using different sub carrier spacing (SCS) values use the same drx-HARQ-RTT-TimerUL/DL value according to an embodiment of the disclosure.

FIG. 1F is a view illustrating a problem arising when BWPs using different SCS values use the same drx-HARQ-RTT-TimerUL/DL value according to an embodiment of the disclosure.

Referring to FIG. 1F, a BWP1 1f-01 and a BWP2 1f-02, which are managed in a cell belonging to the same cell group, may have different SCS values 2N and N. During a C-DRX operation, UE uses the same drx-HARQ-RTT-TimerUL/DL value (a value given on a symbol basis within a DRX-Config IE configured on a cell group basis) in the respective BWPs. However, since a symbol duration is different according to a SCS value used in each BWP, an absolute time length of actually applied drx-HARQ-RTT-TimerUL/DL may be different in the BWP1 1f-01 and the BWP2 1f-02.

Specifically, since the SCS value of the BWP1 1*f*-01 is 2 times larger than the SCS value of the BWP2 1*f*-02 in FIG. 1F, the symbol duration in the BWP1 1*f*-01 may be 2 times shorter than the symbol duration in the BWP2 1*f*-02. Accordingly, a drx-HARQ-RTT-TimerUL/DL absolute time 1*f*-05 in the BWP1 1*f*-01 may be 2 times shorter than a drx-HARQ-RTT-TimerUL/DL absolute time 1*f*-15 in the BWP2 1*f*-02. Accordingly, when a drx-HARQ-RTT-TimerUL/DL value is configured on the symbol basis according to a processing time 1*f*-10 that is taken for the base station to prepare downlink data transmission after processing uplink data transmitted by the UE in the BWP1 1*f*-01, in the BWP2 1*f*-02, a drx-HARQ-RTT-TimerUL/DL absolute time that is two times longer than in the BWP1 1*f*-01 may be used.

However, an actual processing time 1*f*-20 taken for the base station to prepare downlink data transmission after processing uplink data transmitted by the UE in the BWP2 1*f*-02 may not increase two times. In this case, the UE may experience an unnecessary time delay 1*f*-25 in the BWP2 1*f*-02.

FIG. 1G is a view illustrating names and ranges of frequency areas defined in NR, and SCS values usable in each area according to an embodiment of the disclosure.

Referring to FIG. 1G, a frequency in an NR system may be largely divided into an FR1 1*g*-5 and an FR2 1*g*-10. In addition, the FR2 band may further be divided into an FR2-1 1*g*-15 band and an FR2-2 1*g*-20 band. In the FR1 band, 15 kHz, 30 kHz, 60 kHz SCS values may be used for user data transmission. In the FR2-1 band, 60 kHz, 120 kHz SCS value may be used for user data transmission. In the FR2-2 band, 120 kHz, 480 kHz, 960 kHz SCS values may be used for user data transmission. 480 kHz, 960 kHz among SCS values used in the FR2-2 band are newly introduced values as an operation range of NR is extended up to the FR2-2 band in Release 17.

The introduction of the new SCS value (480/960 kHz) in the FR2-2 band as described above may make the problem explained in FIG. 1F more serious. For example, when a cell operating in the FR1 band and a cell operating in the FR2-2 band belong to the same cell group, SCS values of BWPs operating in the two cells may have a difference of up to 64 times (when 15 kHz SCS is used in the BWP operating in the FR1 cell, and 960 kHz SCS is used in the BWP operating in the FR2-2 cell). In this case, absolute time values of drx-HARQ-RTT-TimerUL/DL calculated in the respective BWPs may have a difference of up to 64 times, but an actual time taken for the base station to process uplink data transmitted by the UE and to prepare downlink data may not increase or decrease in proportion to the SCS value. Therefore, an unnecessary delay time may further increase.

Accordingly, the disclosure provides, as set forth below, methods for removing or mitigating an unnecessary delay time, which may occur in a specific BWP when BWPs using different SCS values are operated in the same cell group and a common drx-HARQ-RTT-TimerUL/DL value is configured on a symbol basis in each cell group.

FIG. 1H is a view illustrating a method of configuring drx-HARQ-RTT-TimerUL/DL for each SCS according to an embodiment of the disclosure.

Referring to FIG. 1H, a drx-HARQ-RTT-TimerUL/DL value may be configured according to a SCS value. In this case, it may be selectively determined whether a separate drx-HARQ-RTT-TimerUL/DL value is configured for each SCS, according to an SCS value configured and used in a corresponding cell group. When a separate drx-HARQ-RTT-TimerDL value 1*h*-05 and a separate drx-HARQ-RTT-TimerUL value 1*h*-10 are configured for each of 15/30/60/120/480/960 kHz SCSs as shown in FIG. 1H, a base station and UE may individually configure and apply a drx-HARQ-RTT-TimerUL/DL value corresponding to an SCS value used in each BWP. Accordingly, even when there are BWPs using different SCS values in the same cell group, a different drx-HARQ-RTT-TimerUL/DL value is configured and applied according to an SCS value used in each BWP, so that a delay time unnecessarily occurring in a specific BWP may be removed. Operations of UE and a base station that may be added to achieve this are as follows.

When drx-HARQ-RTT-TimerUL/DL is configured for each SCS as shown in FIG. 1H, the UE may include, in UE capability information 1*c*-10 described in FIG. 1C, information indicating whether the UE has capability of interpreting and applying the drx-HARQ-RTT-TimerUL/DL value configured for each SCS, and may deliver the information to the base station. To achieve this, a new UE capability parameter may be defined.

Based on the UE capability information reported by the UE, the base station may determine whether the UE has capability of configuring drx-HARQ-RTT-TimerUL/DL for each SCS. Even when a separate parameter indicating whether configuration of drx-HARQ-RTT-TimerUL/DL for each SCS is supported is not included in the UE capability information 1*c*-10, the base station may determine whether the UE supports the function of configuring drx-HARQ-RTT-TimerUL/DL for each SCS indirectly through an existing parameter such as AccessStratumRelease. When it is determined that the UE supports the function of configuring drx-HARQ-RTT-TimerUL/DL for each SCS, the base station may calculate a time that is taken for the base station to process uplink data transmitted by the UE and to transmit downlink data corresponding to the uplink data when each SCS is used, on a symbol basis (or an absolute time basis such as sec, msec), and then, may configure an appropriate drx-HARQ-RTT-TimerUL/DL value for each SCS. The configured drx-HARQ-RTT-TimerUL/DL value may be delivered to the UE through RRCReconfiguration 1*c*-15 of FIG. 1C.

When the base station configures the drx-HARQ-RTT-TimerUL/DL value for each SCS in a cell group configuration by using a newly defined IE as shown in the example of 1H, the UE may use the drx-HARQ-RTT-TimerUL/DL value corresponding to the SCS value used in each BWP to perform a C-DRX operation in each BWP. When the applied BWP is changed with time (BWP switching occurs), the UE may use a drx-HARQ-RTT-TimerUL/DL value corresponding to an SCS value used in the newly applied BWP without separate additional signaling. When a common drx-HARQ-RTT-TimerUL/DL value is configured in a cell group basis as in a related-art method, the UE may apply the common drx-HARQ-RTT-TimerUL/DL value in all BWPs within the corresponding cell group in the related-art method.

Additionally, all of the contents described above regarding drx-HARQ-RTT-TimerUL/DL (the method of configurating a separate value for each SCS, the method for UE to report to the base station as to whether the UE supports the new configuration method, the method for the base station to determine whether to use the new configuration method based on UE capability information reported by the UE, UE operations performed when the base station uses the new configuration method) may be equally applied to drx-RetransmissionTimerDL/UL.

FIG. 1I is a view illustrating an example of a method of configuring drx-HARQ-RTT-TimerUL/DL for each BWP according to an embodiment of the disclosure.

Referring to FIG. 1I, a drx-HARQ-RTT-TimerUL/DL value may be configured for each BWP. As shown in FIG. 1I, an IE 1*i*-05 including a new drx-HARQ-RTT-TimerUL/DL value may be newly defined, and the IE 1*i*-05 including the new drx-HARQ-RTT-TimerUL/DL value may be included in a newly defined field 1*i*-15 of a BWP-specific configuration 1*i*-10. When a separate drx-HARQ-RTT-TimerUL/DL value is configured for each BWP, a base station and UE may individually configure and apply a drx-HARQ-RTT-TimerUL/DL value corresponding to each BWP. Accordingly, even when there are BWPs using different SCS values in the same cell group, a different drx-HARQ-RTT-TimerUL/DL value is configured and applied in each BWP, so that a delay time unnecessarily occurring in a specific BWP may be removed. Operations of UE and a base station that may be added to achieve this are as follows.

When drx-HARQ-RTT-TimerUL/DL is configured for each BWP as shown in FIG. 1I, the UE may include, in UE capability information 1*c*-10 described in FIG. 1C, information indicating whether the UE has capability of interpreting and applying the drx-HARQ-RTT-TimerUL/DL value configured for each BWP, and may deliver the information to the base station. To achieve this, a new UE capability parameter may be defined.

Based on the UE capability information reported by the UE, the base station may determine whether the UE has capability of configuring drx-HARQ-RTT-TimerUL/DL for each BWP. Even when a separate parameter indicating whether configuration of drx-HARQ-RTT-TimerUL/DL for each BWP is supported is not included in the UE capability information 1*c*-10, the base station may determine whether the UE supports the function of configuring drx-HARQ-RTT-TimerUL/DL for each BWP indirectly through an existing parameter such as AccessStratumRelease. When it is determined that the UE supports the function of configuring drx-HARQ-RTT-TimerUL/DL for each BWP, the base station may calculate a time that is taken for the base station to process uplink data transmitted by the UE and to transmit downlink data corresponding to the uplink data on a symbol basis (or an absolute time basis such as sec, msec) with reference to an SCS value configured in each BWP, and then, may configure an appropriate drx-HARQ-RTT-TimerUL/DL value for each BWP. The configured drx-HARQ-RTT-TimerUL/DL value may be delivered to the UE through RRCReconfiguration 1*c*-15 of FIG. 1C.

When the base station configures the drx-HARQ-RTT-TimerUL/DL value for each BWP by using a newly defined IE as shown in the example of 1I, the UE may use the drx-HARQ-RTT-TimerUL/DL value configured in each BWP to perform a C-DRX operation in each BWP. When a common drx-HARQ-RTT-TimerUL/DL value is configured in a cell group basis as in a related-art method, the UE may apply the common drx-HARQ-RTT-TimerUL/DL value in all BWPs within the corresponding cell group in the related-art method.

Additionally, all of the contents described above regarding drx-HARQ-RTT-TimerUL/DL (the method of configurating a separate value for each BWP, the method for UE to report to the base station as to whether the UE supports the new configuration method, the method for the base station to determine whether to use the new configuration method based on UE capability information reported by the UE, UE operations performed when the base station uses the new configuration method) may be equally applied to drx-RetransmissionTimerDL/UL.

Figure 1J:
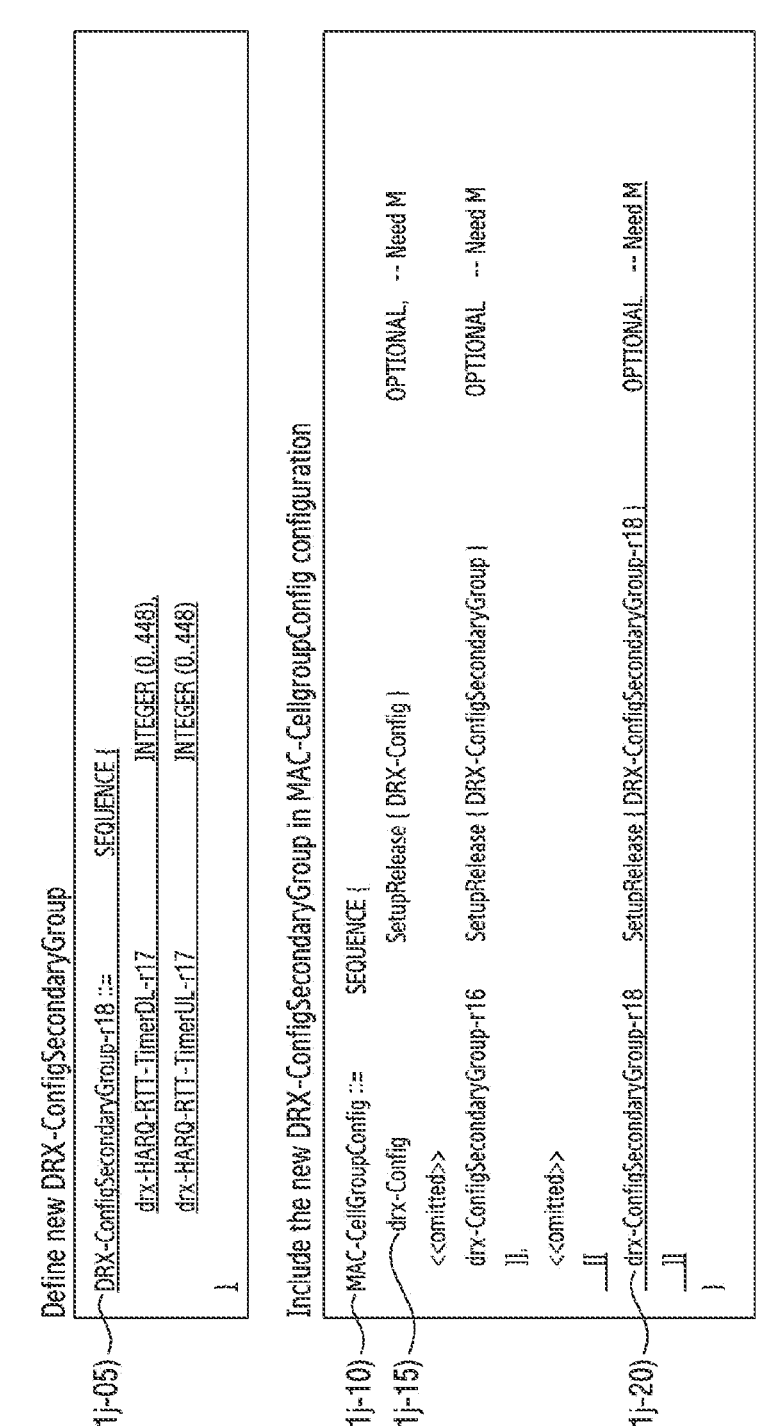
FIG. 1J is a view illustrating an example of a method of configuring drx-HARQ-RTT-TimerUL/DL for each DRX group according to an embodiment of the disclosure.

FIG. 1J is a view illustrating an example of a method of configuring drx-HARQ-RTT-TimerUL/DL for each DRX group according to an embodiment of the disclosure.

Referring to FIG. 1J, a drx-HARQ-RTT-TimerUL/DL value may be configured for each DRX group. As shown in FIG. 1J, an IE 1*j*-05 including a drx-HARQ-RTT-TimerUL/DL value to be applied to a secondary DRX group may be newly defined, and the IE 1*i*-05 including the new drx-HARQ-RTT-TimerUL/DL value may be included in a newly defined field 1*j*-20 of a cell group-specific configuration 1*j*-10. In this case, a drx-HARQ-RTT-TimerUL/DL value in a drx-ConFig field 1*j*-15 configured through the existing drx-Config field 1*j*-15 may be applied to all BWPs in all cells belonging to a Legacy DRX group in the cell group, and a drx-HARQ-RTT-TimerUL/DL value in DRX-Config-SecondaryGroup-r18 1*j*-05 configured through the newly defined field 1*j*-20 may be applied to all BWPs in all cells belonging to the secondary DRX group in the cell group. When a separate drx-HARQ-RTT-TimerUL/DL value is configured for each DRX group, a base station and UE may individually configure and apply a drx-HARQ-RTT-TimerUL/DL value corresponding to each DRX group. In this case, the base station may configure all BWPs in all cells belonging to each DRX group to use the same SCS value, and may configure and apply an appropriate drx-HARQ-RTT-TimerUL/DL value for each DRX group, so that a delay time unnecessarily occurring in a specific BWP may be removed. Operations of UE and a base station that may be added to achieve this are as follows.

When drx-HARQ-RTT-TimerUL/DL is configured for each DRX group as shown in FIG. 1J, the UE may include, in UE capability information 1*c*-10 described in FIG. 1C, information indicating whether the UE has capability of interpreting and applying the drx-HARQ-RTT-TimerUL/DL value configured for each DRX group, and may deliver the information to the base station. To achieve this, a new UE capability parameter may be defined.

Based on the UE capability information reported by the UE, the base station may determine whether the UE has capability of configuring drx-HARQ-RTT-TimerUL/DL for each DRX group. Even when a separate parameter indicating whether configuration of drx-HARQ-RTT-TimerUL/DL for each DRX group is supported is not included in the UE capability information 1*c*-10, the base station may determine whether the UE supports the function of configuring drx-HARQ-RTT-TimerUL/DL for each DRX group indirectly through an existing parameter such as AccessStratumRelease. When it is determined that the UE supports the function of configuring drx-HARQ-RTT-TimerUL/DL for each DRX group, the base station may calculate a time that is taken for the base station to process uplink data transmitted by the UE and to transmit downlink data corresponding to the uplink data on a symbol basis (or an absolute time basis such as sec, msec) with reference to an SCS value configured in each DRX group, and then, may configure an appropriate drx-HARQ-RTT-TimerUL/DL value for each BWP. The configured drx-HARQ-RTT-TimerUL/DL value may be delivered to the UE through RRCReconfiguration 1*c*-15 of FIG. 1C.

When the base station configures the drx-HARQ-RTT-TimerUL/DL value for each DRX group by using a newly defined IE as shown in the example of 1J, the UE may use the drx-HARQ-RTT-TimerUL/DL value configured in each DRX group to perform a C-DRX operation in a BWP in a cell belonging to each DRX group. When a common drx-HARQ-RTT-TimerUL/DL value is configured in a cell group basis as in a related-art method, the UE may apply the common drx-HARQ-RTT-TimerUL/DL value in all BWPs within the corresponding cell group in the related-art method.

Additionally, all of the contents described above regarding drx-HARQ-RTT-TimerUL/DL (the method of configurating a separate value for each DRX group, the method for UE to report to the base station as to whether the UE supports the new configuration method, the method for the base station to determine whether to use the new configuration method based on UE capability information reported by the UE, UE operations performed when the base station uses the new configuration method) may be equally applied to drx-RetransmissionTimerDL/UL.

FIG. 1K is a view illustrating an example of a method of configuring drx-HARQ-RTT-TimerUL/DL for each SCS group according to an embodiment of the disclosure.

Referring to FIG. 1K, a drx-HARQ-RTT-TimerUL/DL value may be configured for each SCS group. In this case, the SCS group may be defined as a set legacy SCS group (15/30/60/120 kHz SCS) of SCS values which are supported in existing FR1 and FR2-1, and a set new SCS group (480/960 kHz SCS) of SCS values which are newly introduced in FR2-2. As shown in FIG. 1K, an IE 1k-10 including a drx-HARQ-RTT-TimerUL/DL value to be applied to a new SCS group may be newly defined. In this case, a drx-HARQ-RTT-TimerUL/DL value in the existing drx-Config field 1k-05 may be applied to a BWP in which an SCS value belonging to the legacy SCS group in the cell group is used, and a drx-HARQ-RTT-TimerUL/DL value in the newly defined field 1k-10 may be applied to a BWP in which an SCS value belonging to the new SCS group in the corresponding cell group is used. Field explanation 1k-15 of the drx-HARQ-RTT-TimerUL/DL may be modified to specify the above-described operations according to standards. When a separate drx-HARQ-RTT-TimerUL/DL value is configured for each SCS group, a base station and UE may individually configure and apply a drx-HARQ-RTT-TimerUL/DL value corresponding to each SCS group. In this case, the base station may configure and apply an appropriate drx-HARQ-RTT-TimerUL/DL value for each SCS group, so that a delay time unnecessarily occurring in a specific BWP may be removed. Operations of UE and a base station that may be added to achieve this are as follows.

When drx-HARQ-RTT-TimerUL/DL is configured for each SCS group as shown in FIG. 1K, the UE may include, in UE capability information 1c-10 described in FIG. 1C, information indicating whether the UE has capability of interpreting and applying the drx-HARQ-RTT-TimerUL/DL value configured for each SCS group, and may deliver the information to the base station. To achieve this, a new UE capability parameter may be defined.

Based on the UE capability information reported by the UE, the base station may determine whether the UE has capability of configuring drx-HARQ-RTT-TimerUL/DL for each SCS group. Even when a separate parameter indicating whether configuration of drx-HARQ-RTT-TimerUL/DL for each SCS group is supported is not included in the UE capability information 1c-10, the base station may determine whether the UE supports the function of configuring drx-HARQ-RTT-TimerUL/DL for each SCS group indirectly through an existing parameter such as AccessStratumRelease. When it is determined that the UE supports the function of configuring drx-HARQ-RTT-TimerUL/DL for each SCS group, the base station may calculate a time that is taken for the base station to process uplink data transmitted by the UE and to transmit downlink data corresponding to the uplink data on a symbol basis (or an absolute time basis such as sec, msec) with reference to an SCS value configured in each SCS group, and then, may configure an appropriate drx-HARQ-RTT-TimerUL/DL value for each SCS group. The appropriate drx-HARQ-RTT-TimerUL/DL value configured for each SCS group may be delivered to the UE through RRCReconfiguration 1c-15 of FIG. 1C.

When the base station configures the drx-HARQ-RTT-TimerUL/DL value for each SCS group by using an existing IE 1k-05 and a newly defined IE 1k-10 as shown in the example of 1K, the value configured for each SCS group may be used to perform a C-DRX operation in a BWP which uses an SCS value included in the corresponding SCS group. When the applied BWP is changed with time (BWP switching occurs), the UE may use a drx-HARQ-RTT-TimerUL/DL value corresponding to an SCS group including an SCS value used in the newly applied BWP without separate additional signaling. When a common drx-HARQ-RTT-TimerUL/DL value is configured in a cell group basis as in a related-art method, the UE may apply the common drx-HARQ-RTT-TimerUL/DL value in all BWPs within the corresponding cell group in the related-art method.

Additionally, all of the contents described above regarding drx-HARQ-RTT-TimerUL/DL (the method of configurating a separate value for each SCS group, the method for UE to report to the base station as to whether the UE supports the new configuration method, the method for the base station to determine whether to use the new configuration method based on UE capability information reported by the UE, UE operations performed when the base station uses the new configuration method) may be equally applied to drx-RetransmissionTimerDL/UL.

In addition to the methods described above in FIGS. 1H, 1I, 1J, and 1K, an existing method may be used to configure drx-HARQ-RTT-TimerUL/DL and drx-RetransmissionTimerDL/UL on a cell group basis, but an absolute time unit (sec, msec, usec) rather than a symbol, slot unit changing according to a SCS value may be used as a unit used for configuration. Through this, even in BWPs using different SCS values, the same absolute time value may be configured for drx-HARQ-RTT-TimerUL/DL and drx-RetransmissionTimerDL/UL. The above-described method may be used when there is no great change in a packet processing rate of a base station even if a SCS value is changed in implementing the base station.

Figure 2:
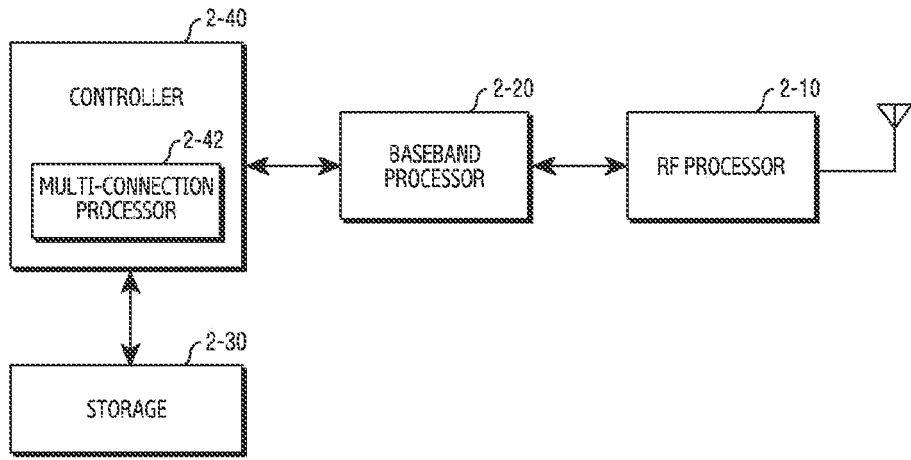
FIG. 2 is a view illustrating a terminal device according to an embodiment of the disclosure.

FIG. 2 is a view illustrating a terminal device according to an embodiment of the disclosure.

Referring to FIG. 2, the terminal may include a radio frequency (RF) processor 2-10, a baseband processor 2-20, a storage 2-30, and a controller 2-40. The configuration of the terminal is not limited to the configuration illustrated in FIG. 2, and the terminal may include fewer or more components than the components illustrated in FIG. 2.

The RF processor 2-10 may perform functions for transmitting and receiving signals via a wireless channel, such as signal band conversion, amplification, etc. For example, the RF processor 2-10 may up-convert a baseband signal provided from the baseband processor 2-20 into an RF band signal, and then may transmit the signal via an antenna, and may down-convert an RF band signal received via the antenna into a baseband signal. For example, the RF processor 2-10 may include a transmission filter, a reception filter, an amplifier, a mixer, an oscillator, a digital to analogue converter (DAC), an analog to digital converter (ADC), or the like, but is not limited thereto. Although only one antenna is illustrated in FIG. 2, the terminal may include a plurality of antennas. In addition, the RF processor 2-10 may include a plurality of RF chains. Furthermore, the RF processor 2-10 may perform beamforming. For the beamforming, the RF processor 2-10 may adjust a phase and a size of each of the signals transmitted and received through the plurality of antennas or antenna elements. In addition, the RF processor 2-10 may perform multiple input multiple output (MIMO), and may receive a plurality of layers when performing MIMO. The RF processor 2-10 may appropriately configure the plurality of antennas or antenna elements under control of the controller to perform reception beam sweeping, or may adjust a direction and a beam width of a reception beam such that the reception beam is coordinated with a transmission beam.

According to an embodiment of the disclosure, the baseband processor 2-20 may perform a function of converting between a baseband signal and a bit stream according to a physical layer specification of a system. For example, when transmitting data, the baseband processor 2-20 may generate complex symbols by encoding and modulating a transmission bit stream. In addition, when receiving data, the baseband processor 2-20 may restore a reception bit stream by demodulating and decoding a baseband signal provided from the RF processor 2-10. For example, when transmitting data according to an orthogonal frequency division multiplexing (OFDM) method, the baseband processor 2-20 may generate complex symbols by encoding and modulating a transmission bit stream, may map the complex symbols onto subcarriers, and then, may construct OFDM symbols through inverse fast Fourier transform (IFFT) operation and cyclic prefix (CP) insertion. In addition, when receiving data, the baseband processor 2-20 may divide a baseband signal provided from the RF processor 2-10 in the unit of an OFDM symbol, may restore signals mapped onto subcarriers through fast Fourier transform (FFT) operation, and then, may restore a reception bit stream by demodulating and decoding.

According to an embodiment of the disclosure, the baseband processor 2-20 and the RF processor 2-10 may transmit and receive signals as described above. Accordingly, the baseband processor 2-20 and the RF processor 2-10 may be referred to as a "transmitter," a "receiver," a "transceiver," or a "communication unit". Furthermore, at least one of the baseband processor 2-20 and the RF processor 2-10 may include a plurality of communication modules to support a plurality of different radio access technologies. In addition, at least one of the baseband processor 2-20 and the RF processor 2-10 may include different communication modules to process signals of different frequency bands. For example, the different radio access technologies may include a wireless local area network (LAN) (for example, IEEE 802.11), a cellular network (for example, long term evolution (LTE)), etc. In addition, the different frequency bands may include a super high frequency (SHF) (for example, 2.

NRHz, NRhz) band, a millimeter wave (for example, 60 GHz) band. The terminal may transmit and receive a signal to and from a base station by using the baseband processor 2-20 and the RF processor 2-10, and the signal may include control information and data.

According to an embodiment of the disclosure, the storage 2-30 may store data such as a basic program, an application program, configuration information for operations of the terminal. For example, the storage 2-30 may store data information such as a basic program, an application program, configuration information for operations of the terminal. In addition, the storage 2-30 may provide stored data according to a request of the controller 2-40. The storage 2-40 may be configured by a storage medium such as a read only memory (ROM), a random access memory (RAM), a hard disk, a compact disc (CD)-ROM, and a digital versatile disc (DVD), or a combination of storage media. In addition, the storage 2-30 may be configured by a plurality of memories. According to an embodiment of the disclosure, the storage 2-30 may store a program for performing DRX.

The controller 2-40 may control overall operations of the terminal. For example, the controller 2-40 may transmit and receive signals via the baseband processor 2-20 and the RF processor 2-10.

In addition, the controller 2-40 may write and read out data on and from the storage 2-30. To achieve this, the controller 2-40 may include at least one processor. For example, the controller 2-40 may include a communication processor (CP) to perform control for communication, and an application processor (AP) to control an upper layer such as an application program. In addition, according to an embodiment of the disclosure, the controller 2-40 may include a multi-connection processor 2-42 configured to process a process operating in a multi-connection mode. In addition, at least one component in the terminal may be implemented by a single chip. In addition, according to an embodiment of the disclosure, the controller 5-40 may include the multi-connection processor 2-42 to perform processing to operate in the multi-connection mode. In addition, each component of the terminal may operate to perform embodiments of the disclosure.

Figure 3:
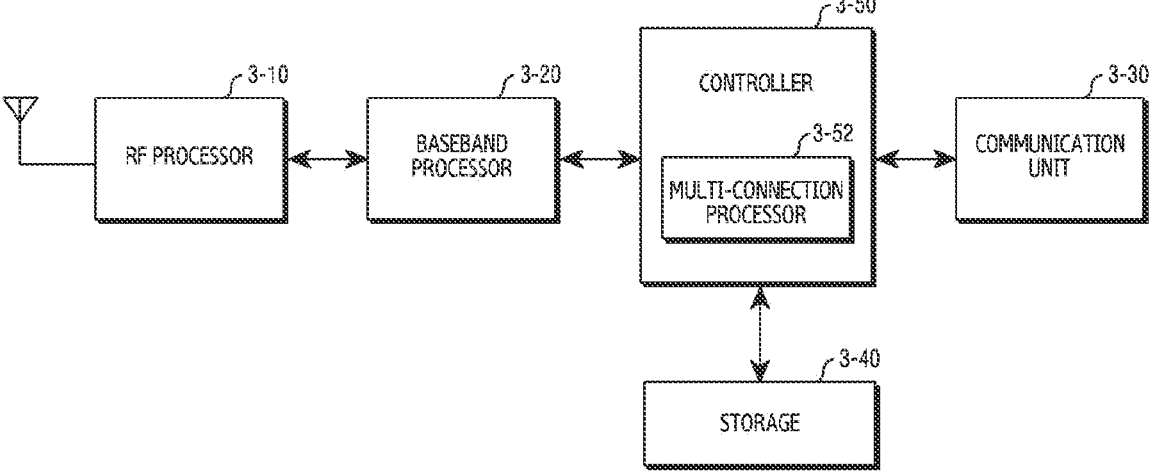
FIG. 3 is a view illustrating a base station device according to an embodiment of the disclosure.

FIG. 3 is a view illustrating a base station device according to an embodiment of the disclosure.

The base station of FIG. 3 may be included in the above-described network. In addition, according to an embodiment of the disclosure, a network entity (or a network function) may have the same or similar configuration as or to that of the base station of FIG. 3.

Referring to FIG. 3, the base station may include an RF processor 3-10, a baseband processor 3-20, a backhaul communication unit 3-30, a storage 3-40, and a controller 3-50. The configuration of the base station is not limited to the configuration illustrated in FIG. 3, and the base station may include fewer or more components than the components illustrated in FIG. 3. The RF processor 3-10 may perform a function for transmitting and receiving signals via a wireless channel, such as signal band conversion, amplification, etc. For example, the RF processor 3-10 may up-convert a baseband signal provided from the baseband processor 3-20 into an RF band signal, and then may transmit the signal via an antenna, and may down-convert an RF band signal received via the antenna into a baseband signal. For example, the RF processor 3-10 may include a transmission filter, a reception filter, an amplifier, a mixer, an oscillator, a DAC, an ADC, or the like. Although only one antenna is illustrated in FIG. 3, the RF processor 3-10 may include a plurality of antennas. In addition, the RF processor 3-10 may include a plurality of RF chains. Furthermore, the RF processor 3-10 may perform beamforming. For the beamforming, the RF processor 3-10 may adjust a phase and a size of each of the signals transmitted and received through the plurality of antennas or antenna elements. In addition, the RF processor 3-10 may perform downward MIMO by transmitting one or more layers.

According to an embodiment of the disclosure, the baseband processor 3-20 may perform a function of converting between a baseband signal and a bit stream according to a physical layer specification. For example, when transmitting data, the baseband processor 3-20 may generate complex symbols by encoding and modulating a transmission bit stream. When receiving data, the baseband processor 3-20 may restore a reception bit stream by demodulating and decoding a baseband signal provided from the RF processor 3-10. For example, when transmitting data according to an OFDM method, the baseband processor 3-20 may generate complex symbols by encoding and modulating a transmission bit stream, may map the complex symbols onto subcarriers, and then, may construct OFDM symbols through IFFT operation and CP insertion. In addition, when receiving data, the baseband processor 3-20 may divide a baseband signal provided from the RF processor 3-10 in the unit of an OFDM symbol, may restore signals mapped onto subcarriers through FFT operation, and then, may restore a reception bit stream by demodulating and decoding. The baseband processor 3-20 and the RF processor 3-10 may transmit and receive signals as described above. Accordingly, the baseband processor 3-20 and the RF processor 3-10 may be referred to as a "transmitter," a "receiver," a "transceiver," a "communication unit," or a "wireless communication unit". The base station may transmit and receive a signal to and from a terminal by using the baseband processor 3-20 and the RF processor 3-10, and the signal may include control information and data.

According to an embodiment of the disclosure, the backhaul communication unit 3-30 may provide an interface for communicating with other nodes in a network. For example, the backhaul communication unit 3-30 may convert a bit stream to be transmitted from the base station to another node, for example, a sub-base station, a core network, into a physical signal, and may convert a physical signal transmitted from another node into a bit stream.

According to an embodiment of the disclosure, the storage 3-40 may store data such as a basic program, an application program, configuration information for operations of the base station. For example, the storage 3-40 may store information regarding a bearer assigned to a connected terminal, a result of measurement reported by the connected terminal. In addition, the storage 3-40 may store information regarding a criterion for determining whether to provide multi-connection to a terminal or to suspend. In addition, the storage 3-40 may provide stored data according to a request of the controller 3-50. The storage 3-40 may be configured by a storage medium such as a ROM, a RAM, a hard disk, a CD-ROM, and a DVD, or a combination of storage media. In addition, the storage 3-40 may be configured by a plurality of memories. According to an embodiment of the disclosure, the storage 3-40 may store a program for performing DRX.

The controller 3-50 may control overall operations of the main base station. For example, the controller 3-50 may transmit and receive a signal via the baseband processor 3-20 and the RF processor 3-10 or the backhaul communication unit 3-30. In addition, the controller 3-50 may write and read out data on and from the storage 3-40. To achieve this, the controller 3-50 may include at least one processor. In addition, according to an embodiment, the controller 3-50 may include a multi-connection processor 3-52 configured to process a process operating in a multi-connection mode.

According to an embodiment of the disclosure, a DRX operating method of a terminal may include: receiving a UE capability enquiry message from a base station; in response to the UE capability enquire message, transmitting, to the base station, a UE capability information message including information regarding DRX capability; receiving, from the base station, at least one DRX parameter corresponding to a plurality of SCS values respectively, based on the UE capability information message; and performing a DRX operation based on the received DRX parameter.

According to an embodiment of the disclosure, a DRX operating method of a base station may include: transmitting a UE capability enquiry message to a terminal; receiving, from the terminal, a UE capability information message including information regarding DRX capability; determining at least one DRX parameter corresponding to a plurality of SCS values respectively, based on the UE capability information message; and transmitting the determined DRX parameter to the terminal.

The disclosure provides an apparatus and a method for effectively providing a service in a wireless communication system.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (software module, software) may be stored in a random access memory, a non-volatile memory including a flash memory, a read only memory (ROM), an electrically erasable programmable read only memory (EE-PROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the disclosure, the term "computer program product" or "computer readable medium" may be used to indicate a memory, a hard disk installed in a hard disk drive, and a medium of a signal. The "computer program product" or "computer readable medium" may be a configuration provided for a method of reporting UE capability in a wireless communication system according to the disclosure.

A machine-readable storage medium may be provided in the form of a non-transitory storage medium. Wherein, the term "non-transitory" simply means that the storage medium is a tangible device, and does not include a signal (for example, an electromagnetic wave), but this term does not differentiate between where data is semi-permanently stored in a storage medium and where data is temporarily stored in the storage medium. For example, the 'non-transitory storage medium' may include a buffer in which data is temporarility stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a CD-ROM), or be distributed (e.g., downloaded or uploaded) online via an application store (e.g., Play Store™), or between two user devices (e.g., smart phones) directly. If distributed online, at least part of the computer program product (for example, a downloadable application) may be temporarily generated or at least temporarily stored in a machine-readable storage medium, such as memory of a manufacturer's server, a server of the application store, or a relay server.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Embodiments of the disclosure disclosed in the specification and the drawings propose specific examples for easy explanation of the technical features of the disclosure and for easy understanding of the disclosure, and do not limit the scope of the disclosure. That is, it is obvious to a person skilled in the art that other variations based on the technical concept of the disclosure are possible. In addition, the above-described embodiments may be operated in combination when necessary. For example, a base station and a terminal may operate in combination of an embodiment of the disclosure and some of other embodiments. In addition, embodiments of the disclosure may be applicable to other communication systems, and other variations based on the technical concept of the embodiments are also possible. For example, the embodiments may be applied to an LTE system, a 5G, NR system, or a 6G system. Therefore, the scope of the disclosure should not be defined only by the above-described embodiments and should be defined by the claims described below and equivalents thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   transmitting, to a base station, UE capability information;

receiving, from the base station, configuration information regarding a discontinuous reception (DRX) operation, wherein the configuration information includes a first value of a timer for a first subcarrier spacing (SCS) group and a second value of the timer for a second SCS group, in case that the UE is identified based on the UE capability information to support the second SCS group;

applying one of the first value of the timer and the second value of the timer to the timer based on a SCS group, wherein the first value of the timer is applied to the first SCS group, and the second value of the timer is applied to the second SCS group; and performing the DRX operation based on the timer, wherein the first SCS group includes 15 KHz SCS, 30 KHz SCS, 60 KHz SCS, and 120 KHz SCS, and the second SCS group includes 480 KHz SCS and 960 KHz SCS.

2. The method of claim 1, wherein the timer includes a drx-HARQ-RTT-TimerUL timer and a drx-HARQ-RTT-TimerDL timer.

3. The method of claim 1, further comprising:
   receiving, from the base station, a request for the UE capability information.

4. A method performed by a base station in a wireless communication system, the method comprising:
   receiving, from a user equipment (UE), UE capability information;

transmitting, to the UE, configuration information regarding a discontinuous reception (DRX) operation, wherein the configuration information includes a first value of a timer for a first subcarrier spacing (SCS) group and a second value of the timer for a second SCS group, in case that the UE is identified based on the UE capability information to support the second SCS group; and performing the DRX operation based on the timer, wherein the one of the first value of the timer and the second value of the timer is applied to the timer based on a SCS group, wherein the first value of the timer is applied to the first SCS group, and the second value of the timer is applied to the second SCS group, and wherein the first SCS group includes 15 KHz SCS, 30 KHz SCS, 60 KHz SCS, and 120 KHz SCS, and the second SCS group includes 480 KHz SCS and 960 KHz SCS.

5. The method of claim 4, wherein each of the first value of the timer for the first SCS group and the second value of the timer for the second SCS group is for at least one of a drx-HARQ-RTT-TimerUL timer or a drx-HARQ-RTT-TimerDL timer.

6. The method of claim 4, further comprising:
   transmitting, to the UE, a request for the UE capability information.

7. A user equipment (UE) in a wireless communication system, the UE comprising:
   at least one transceiver; and
   at least one processor operatively coupled with the at least one transceiver,
   wherein the at least one processor is configured to:
      transmit, to a base station, UE capability information,
      receive, from the base station, configuration information regarding a discontinuous reception (DRX) operation, wherein the configuration information includes a first value of a timer for a first subcarrier spacing (SCS) group and a second value of the timer for a second SCS group, in case that the UE is identified based on the UE capability information to support the second SCS group, apply one of the first value of the timer and the second value of the timer to the timer based on a SCS group, wherein the first value of the timer is applied to the first SCS group, and the second value of the timer is applied to the second SCS group, and perform the DRX operation based on the timer, and wherein the first SCS group includes 15 KHz SCS, 30 KHz SCS, 60 KHz SCS, and 120 KHz SCS, and the second SCS group includes 480 KHz SCS and 960 KHz SCS.

8. The UE of claim 7, wherein the timer includes a drx-HARQ-RTT-TimerUL timer and a drx-HARQ-RTT-TimerDL timer.

9. The UE of claim 7, wherein the at least one processor is further configured to:

receive, from the base station, a request for the UE capability information.

10. A base station in a wireless communication system, the base station comprising:

at least one transceiver; and at least one processor operatively coupled with the at least one transceiver, wherein the at least one processor is configured to:

receive, from a user equipment (UE), UE capability information, transmit, to the UE, configuration information regarding a discontinuous reception (DRX) operation, wherein the configuration information includes a first value of a timer for a first subcarrier spacing (SCS) group and a second value of the timer for a second SCS group, in case that the UE is identified based on the UE capability information to support the second SCS group, and perform the DRX operation based on the timer, wherein the one of the first value of the timer and the second value of the timer is applied to the timer based on a SCS group, wherein the first value of the timer is applied to the first SCS group, and the second value of the timer is applied to the second SCS group, and wherein the first SCS group includes 15 KHz SCS, 30 KHz SCS, 60 KHz SCS, and 120 KHz SCS, and the second SCS group includes 480 KHz SCS and 960 KHz SCS.

11. The base station of claim 10, wherein each of the first value of the timer for the first SCS group and the second value of the timer for the second SCS group is for at least one of a drx-HARQ-RTT-TimerUL timer or a drx-HARQ-RTT-TimerDL timer.

12. The base station of claim 10, wherein the at least one processor is further configured to:

transmit, to the UE, a request for UE capability.

* * * * *